United States Patent
Monteiro Soares et al.

(10) Patent No.: US 11,409,565 B2
(45) Date of Patent: Aug. 9, 2022

(54) METHODS, COMPUTING UNIT AND MEMORY POOL FOR ENABLING USAGE OF REMOTE MEMORY RESOURCES

(71) Applicant: Telefonaktiebolaget LM Ericsson (publ), Stockholm (SE)

(72) Inventors: Joao Monteiro Soares, Solna (SE); Amir Roozbeh, Kista (SE); Mozhgan Mahloo, Solna (SE); Chakri Padala, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 166 days.

(21) Appl. No.: 16/955,068

(22) PCT Filed: Dec. 20, 2017

(86) PCT No.: PCT/SE2017/051319
§ 371 (c)(1),
(2) Date: Jun. 18, 2020

(87) PCT Pub. No.: WO2019/125251
PCT Pub. Date: Jun. 27, 2019

(65) Prior Publication Data
US 2020/0379811 A1    Dec. 3, 2020

(51) Int. Cl.
*G06F 9/50* (2006.01)
*G06F 12/02* (2006.01)
*G06F 12/06* (2006.01)

(52) U.S. Cl.
CPC .......... *G06F 9/5016* (2013.01); *G06F 9/5072* (2013.01); *G06F 12/0238* (2013.01);
(Continued)

(58) Field of Classification Search
CPC .. G06F 9/5016; G06F 9/5072; G06F 12/0238; G06F 12/0646; G06F 2209/5011; G06F 2212/7201; G06F 9/5061
See application file for complete search history.

(56) References Cited

U.S. PATENT DOCUMENTS

| 2006/0159456 | A1 | 7/2006 | Gumaste et al. |
| 2009/0142055 | A1 | 6/2009 | Qiu et al. |
| 2013/0066951 | A1* | 3/2013 | Agranat .............. H04J 14/0227 709/217 |

OTHER PUBLICATIONS

International Search Report and Written Opinion for International Application No. PCT/SE2017/051319, dated Sep. 19, 2018, 11 pages.
(Continued)

*Primary Examiner* — Sisley N Kim
(74) *Attorney, Agent, or Firm* — Nicholson De Vos Webster & Elliott LLP

(57) ABSTRACT

A computing unit, a memory pool and methods therein, for enabling the computing unit to use memory resources in the memory pool, e.g. as configured by a resource scheduler. When a memory unit in the memory pool is allocated to the computing unit and an optical wavelength is assigned for communication between the computing unit and the allocated memory unit over an optical network, the computing unit is configured with a first mapping between the assigned optical wavelength and the allocated memory unit. Thereby, the optical network can be utilized efficiently to achieve rapid and reliable communication of messages from the computing unit to the allocated memory unit.

22 Claims, 7 Drawing Sheets

(52) U.S. Cl.
CPC .. *G06F 12/0646* (2013.01); *G06F 2209/5011* (2013.01); *G06F 2212/7201* (2013.01)

(56) References Cited

OTHER PUBLICATIONS

"Ericsson Hyperscale Datacenter System 8000," 2016, 5 pages, downloaded from https://www.ericsson.com/hyperscale/cloud-infrastructure/hyperscale-datacenter-system on Jun. 28, 2017.
"Propel Your Data Center Into the Future, Intel® Rack Scale Design," 3 pages, downloaded from https://www.intel.in/content/www/in/en/architecture-and-technology/rack-scale-design-overview.html on Jun. 27, 2017.
International Preliminary Report on Patentability for International Application No. PCT/SE2017/051319, dated Jul. 2, 2020, 9 pages.

\* cited by examiner

METHODS, COMPUTING UNIT AND MEMORY POOL FOR ENABLING USAGE OF REMOTE MEMORY RESOURCES

CROSS-REFERENCE TO RELATED APPLICATIONS

This application is a National stage of International Application No. PCT/SE2017/051319, filed Dec. 20, 2017, which is hereby incorporated by reference.

TECHNICAL FIELD

The present disclosure relates generally to a computing unit, a memory pool and methods therein, for enabling usage of remote memory resources in the memory pool.

BACKGROUND

In current server technology, a server basically involves a processing function for processing data and a storing function for storing data, which functions are typically co-located in the same physical entity. It has recently been proposed that a server could be created with "disaggregated" hardware meaning that the processing function resides in a computing unit that uses storing resources in a memory unit which is located separate, i.e. "remote" from the computing unit, e.g. in a cloud-like environment. When the computing unit needs to store data or other information, it can send a memory request over a communication network to a center or the like where storing resources in the form of memory units are available, which may be hired by clients in a cloud-like manner. Such a center with multiple memory units is sometimes referred to as a "memory pool" which term will be used herein.

FIG. 1 illustrates a conventional way of employing a server comprised of a computing unit 100 and storing resources in a remote memory pool 102, the term "remote" basically implying that the memory pool 102 is located separate from the computing unit 100 such that data needs to be communicated between them over a communication network 104 which could be a public or a private network or any combination thereof. The actual physical distance between the computing unit 100 and the remote memory pool 102 has no particular significance in this description.

The memory pool 102 thus comprises multiple memory units 102A, of which only a few are shown in this figure for simplicity, and one or more of them can be selected and allocated for use by the computing unit 100. It is also possible to allocate only a portion of a memory unit to a computing unit. In this example, "Memory unit-1" has been selected and allocated for the computing unit 100 and data is thus communicated between computing unit 100 and Memory unit-1 over the communication network 104. The computing unit 100 may similarly reside in a data center or the like with multiple computing units, not shown. In this network 104, existing solutions that can be used for managing connections between hardware components are dependent on the Internet Protocol, IP, Ethernet, InfiniBand, PCIe or other communication protocols.

When sending data or a request for storing resources to the memory pool 102, the computing unit 100 typically needs to address the individual memory unit(s) 102A allocated to the computing unit 100. In such a configuration with the computing unit 100 separated from the memory unit(s) 102A by a communication network, it is a challenge to provide high bandwidth and low latency in the communication between the units 100, 102A across the network.

However, it sometimes necessary to change configuration of the memory pool, e.g. by removing, adding or modifying one or more memory units therein. It may also be necessary to change allocation of one or more memory units to a computing unit, which may require that data used by the computing unit is moved from one memory unit to another. This re-configuring operation requires substantial signaling to the computing unit so as to change its configuration of allocated memory units. Hence, any change of memory unit allocation to the computing unit entails complex and time-consuming signaling.

It is also a drawback that the commonly used communication networks must employ generally time-consuming routing and forwarding operations so that transport of data and messages between the computing unit and the memory pool is typically slow, which reduces the performance of a server or the like comprised of the computing unit and one or more memory units in the memory pool. Moreover, a configuration with point to point optical fibers between each pair of compute unit and memory pool(s), would be both complex and costly to implement, also having low flexibility for adaptions and modifications.

SUMMARY

It is an object of embodiments described herein to address at least some of the problems and issues outlined above. It is possible to achieve this object and others by using a computing unit, a memory pool and methods therein, as defined in the attached independent claims.

According to one aspect, a method is performed by a computing unit for using remote memory resources in a memory pool. In this method, the computing unit receives a first mapping between an optical wavelength and at least one virtual address associated to a memory unit in the memory pool allocated to the computing unit. The computing unit further sends data or a storing request to the allocated memory unit on the optical wavelength over an optical network using said at least one virtual address as destination address, according to said first mapping.

According to another aspect, a computing unit is arranged to use remote memory resources in a memory pool. The computing unit is configured to receive a first mapping between an optical wavelength and at least one virtual address associated to a memory unit in the memory pool allocated to the computing unit. The computing unit is also configured to send data or a storing request to the allocated memory unit on the optical wavelength over an optical network using said at least one virtual address as destination address, according to said first mapping.

According to another aspect, a method is performed by a memory pool for enabling one or more computing units to use remote memory resources in the memory pool. In this method, the memory pool receives a first mapping between an optical wavelength and at least one virtual address associated to a memory unit in the memory pool allocated to a first computing unit. The memory pool also receives a second mapping between the at least one virtual address and a physical address of the allocated memory unit within the memory pool. Further, the memory pool routes data or a storing request with the at least one virtual address as destination address, as received on the optical wavelength from the first computing unit, to said allocated memory unit according to the received first and second mappings.

According to another aspect, a memory pool is arranged to enable one or more computing units to use remote memory resources in the memory pool. The memory pool is configured to receive a first mapping between an optical wavelength and at least one virtual address associated to a memory unit in the memory pool allocated to a first computing unit, and to receive a second mapping between the at least one virtual address and a physical address of the allocated memory unit within the memory pool. The memory pool is also configured to route data or a storing request with the at least one virtual address as destination address, as received on the optical wavelength from the first computing unit, to said allocated memory unit according to the received first and second mappings.

The above computing unit, memory pool and methods therein may be configured and implemented according to different optional embodiments to accomplish further features and benefits, to be described below.

A computer program is also provided comprising instructions which, when executed on at least one processor in either of the computing unit and the memory pool, cause the at least one processor to carry out the respective methods described above. A carrier is also provided which contains the above computer program, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Figure 1:
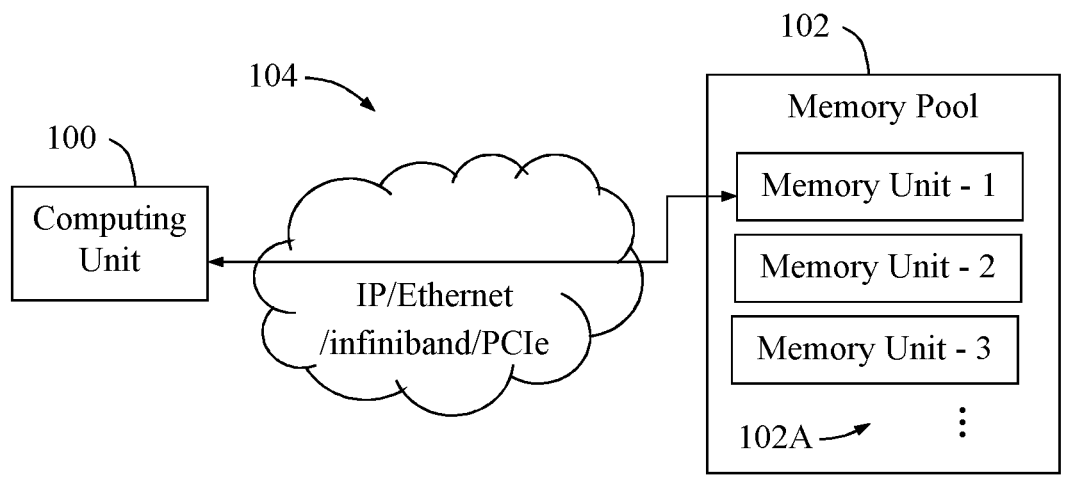
FIG. 1 is a communication scenario illustrating how a computing unit can use remote memory resources in a memory pool, according to the prior art.

Briefly described, a solution is provided to enable efficient and rapid communication of data and other information between a computing unit and a memory pool over a communication network, so as to provide improved performance and reduced delays when the computing unit communicates with one or more memory units in the memory pool. The solution also enables automatic configuration and adaption of the memory unit and the memory pool which thereby does not require any manual activity. It was indicated above that a complete memory unit or only a portion thereof could be allocated to a computing unit, but the examples herein refer to allocation of a complete memory unit for simplicity although it should be noted that the solution is not limited thereto.

To enable rapid transfer of data and messages from the computing unit, an optical network is used for the communication which is capable of routing signals carried by an optical wavelength towards a destination, based on the optical wavelength. Wavelength based optical networks as such are commonly used in the field of data communication, for rapid and efficient transport of signals in a conventional manner which is not necessary to describe in any detail herein.

The term "memory pool" is used herein to denote a center or site with multiple memory units which can be allocated to different computing units. This means that a server functionality or the like can be created by allocating one or more memory units to a computing unit so that data can be stored in the allocated memory unit(s) and processed by the computing unit. This arrangement thus requires communication of data and requests between the computing unit and the allocated memory unit(s) in the memory pool. In this solution, this communication is performed over an optical network and one or more optical switches therein.

The memory pool in this description could alternatively be referred to as a memory or data storage center, and the functionality described herein for the memory pool may be realized in a memory managing entity associated with the memory pool and memory units therein. These memory units are referred to herein as remote memory resources in the memory pool. The memory pool will be described here in terms of a logic functional entity for simplicity, regardless of how it is implemented in practice.

The above advantages can be accomplished by the computing unit and the memory pool being configured with at least one optical wavelength and mappings in a manner to be described below, so that they can be connected to one another and communicate over an optical network using a specific optical wavelength that is assigned to the communication. Functionality in the computing unit and in the memory pool are provided for communication according to said configuration of optical wavelength and mappings. For example, a "resource scheduler" or similar may be used for scheduling processing and storing resources for clients or the like, e.g. in a data center with processing resources referred to as "computing units" herein, and in a memory pool with storing or memory resources referred to as "memory units" herein. Further, the term memory resources is sometimes used herein as a synonym for storing resources.

Even though the term "cloud" is used herein from time to time as an example, the description is not limited in this respect and the embodiments and examples described herein can be used in other situations as well, such as when both the computing unit and an affiliated memory pool are owned and managed by the same party.

The computing unit and the memory pool, as well as the optical network, are configured with an optical wavelength that is assigned for communication of data and messages between the computing unit and an allocated memory unit in the memory pool over an optical network between the computing unit and the memory pool. These configurations may be made by the above-mentioned resource scheduler, although the solution is not limited thereto. For example, when the computing unit transmits data or a request for memory resources on the assigned optical wavelength, the data or request will be routed across the optical network to the memory pool according to the used optical wavelength. In the following description, the term "message" is used for short to represent data or a request for storing resources, as sent by a computing unit towards a memory pool.

Figure 2:
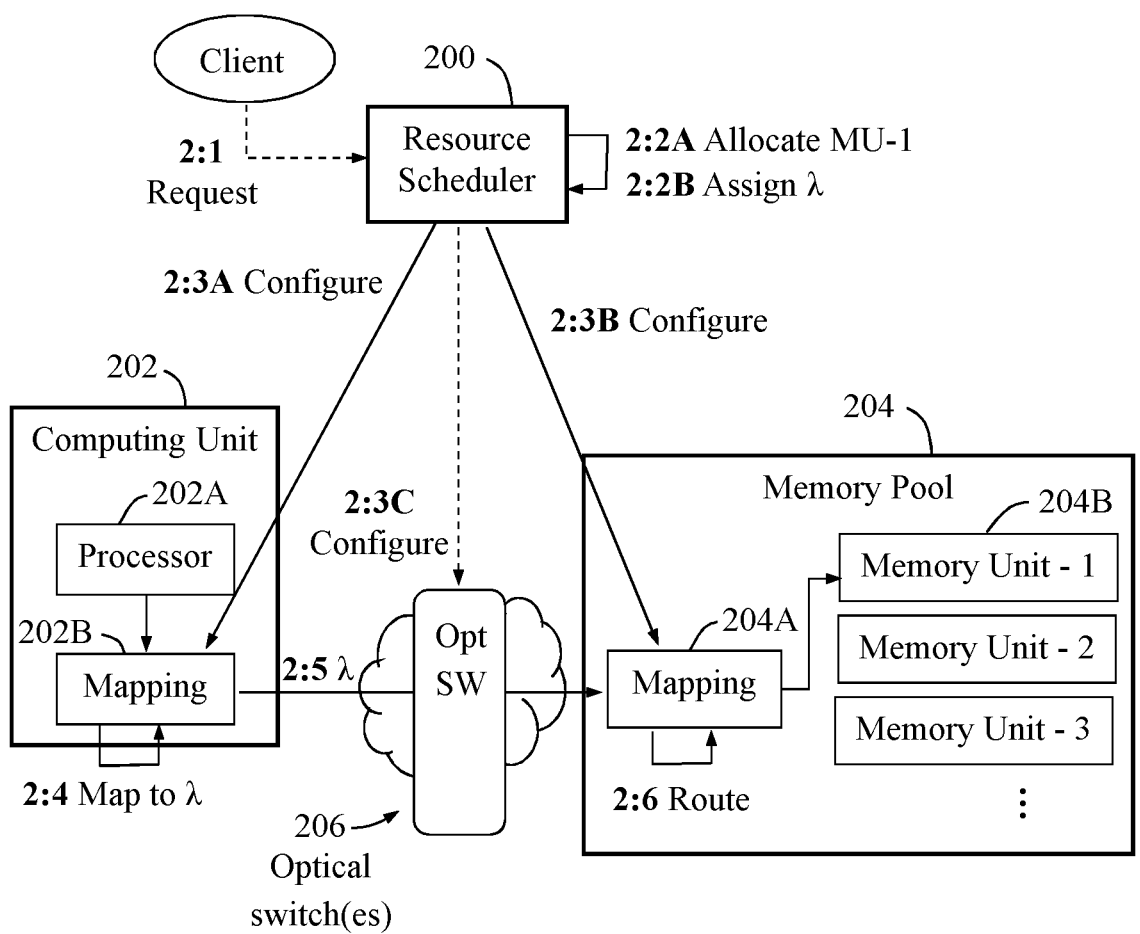
FIG. 2 is a communication scenario illustrating an example of how the solution may be employed, according to some example embodiments.

In FIG. 2, a communication scenario is shown involving a computing unit 202, a memory pool 204 and an optical network comprising one or more optical switches 206, the figure serving as an illustrative example of how procedures could be executed by the computing unit 202 and the memory pool 204 for enabling the computing unit 202 to use memory resources in the memory pool 204. In this example scenario, a resource scheduler 200 is employed for providing mappings to the computing unit 202 and the memory pool 204 by means of respective configuration operations, as follows. The memory pool 204 comprises a number of memory units of which only three are shown for simplicity. Each memory unit has a physical address and virtual addresses are also used which can be translated, or "mapped", into physical addresses as described below.

The resource scheduler 200 may initially receive a request from a schematically indicated "client", in an action 2:1, to connect a computing unit with at least one memory unit, so as to create a server functionality or the like with processing and storing abilities. In response to said request, the resource scheduler 200 may select and allocate a computing unit from a data center or the like, not shown, and in this example the computing unit 202 is selected or otherwise identified and which comprises some processing functionality schematically indicated as a processor 202A. The computing unit 202 may be identified by the client in the request, e.g. when it is owned and/or controlled by the client. The processing to be performed by the computing unit 202 is outside the procedures described herein, it is just assumed that storing resources are needed.

In response to said request, the resource scheduler 200 allocates storing resources in the memory pool 204 and in this example a memory unit 204B is allocated, in an action 2:2A, to serve the computing unit 202 with storing functionality. As mentioned above, it is possible to allocate more than one memory unit and even only a part of a memory unit, e.g. depending on the request and the current capabilities of available memory units, but the examples herein thus refer to allocation of one complete memory unit for simplicity. It may basically be a matter of practical implementation how and where storing resources in one or more memory units are allocated to a computing unit.

An optical wavelength $\lambda$ is further assigned for communication of data and messages between the computing unit 202 and the allocated memory unit 204B over the optical network 206, which optical wavelength in this example is assigned by the resource scheduler 200 in an action 2:2B. In this description, "an optical wavelength" should be understood as at least one optical wavelength and even though the examples herein refer to an optical wavelength it is also possible that a range of multiple optical wavelengths are assigned for the computing unit 202, which are mapped to different virtual addresses that can be associated to different memory units and/or parts thereof. For example, one optical wavelength may be mapped to one virtual address or to a set of multiple virtual addresses, or a set of multiple optical wavelengths may even be mapped to the same virtual or physical address.

Various mappings are then configured, in this case by the resource scheduler 200, in the computing unit 202, the memory pool 204, and in one or more switches 206 in the optical network, as follows. In order to use the configured mappings in communication of messages, the computing unit 202 comprises a mapping function 202B and the memory pool 204 likewise comprises a mapping function 204A.

Firstly, an action 2:3A illustrates that the computing unit 202 is configured with a first mapping between the assigned optical wavelength $\lambda$ and the allocated memory unit 204B. This mapping may map the wavelength $\lambda$ to at least one virtual address associated with one or more allocated memory units, meaning that a virtual address can be translated into a physical address of the corresponding memory unit 204B. Thereby, the computing unit 202 is able to send a message on the optical wavelength $\lambda$ with the virtual address as destination, which message will be routed by the network to the memory pool 204 which in turn will route the message to the memory unit(s) that is (are) associated to the virtual address.

Secondly, an action 2:3B illustrates that the memory pool 204 is configured with the first mapping between wavelength $\lambda$ and the memory unit 204B which in this case is represented by a virtual address. In this action, the memory pool 204 is also configured with a second mapping that maps the virtual address to a physical address of the allocated memory unit 204B within the remote memory pool. Thereby, the mapping function 204A in memory pool 204 is able to translate the virtual address in a received message to the physical address according to the second mapping and forward the message to memory unit 204B.

Even though the examples herein refer to "a virtual address", the first mapping configured in the memory pool 204 may be done for a range of multiple virtual addresses which could be mapped to one particular optical wavelength. Further, the second mapping may map one virtual address to one physical address, or a set of multiple virtual addresses may be mapped to the same physical address. A memory unit may also have a range of physical addresses representing different parts of its volume.

Thirdly, an action 2:3C illustrates that one or more optical switches 206 in the optical network are also configured with a mapping between the assigned optical wavelength $\lambda$ and the memory pool 204. Thereby, the optical switches 206 will route any messages coming from the computing unit 202 on the wavelength $\lambda$, to the memory pool 204 based on the wavelength $\lambda$.

When the above mappings are put into use for communicating a message from the computing unit 202 to the memory unit 204B, the mapping function 202B in the computing unit 202 maps the virtual address of the allocated memory unit 204B to the assigned optical wavelength $\lambda$, in an action 2:4. The computing unit 202 then sends the message on the wavelength $\lambda$ with the virtual address as destination over the optical network, in another action 2:5, and the optical switches 206 in the network will route the message towards the memory pool 204. It should be noted that the memory pool 204 can also use the virtual address as source address for any data or messages sent in the opposite direction from the memory unit 204B to the computing unit 202.

When receiving the message with the virtual address on the wavelength λ, the mapping function 204A in the memory pool 204 detects the virtual address as the message's destination and thus routes the message to the memory unit 204B that is associated with that virtual address, in an action 2:6. In more detail, the message is routed to the memory unit's 204B physical address to which the virtual address is mapped according to the second mapping.

In the memory pool 204, each memory unit has at least one routable physical address and the second mapping maps virtual addresses to physical addresses, which mapping may be changed internally if needed without affecting the computing unit 202 nor the optical network's switches 206. For example, a virtual address in use can easily be mapped to a physical address of a new memory unit, just by reconfiguring the second mapping in the memory pool 204 without changing the mappings already configured in the computing unit 202 and in the optical switches 206. Further, the above mappings may be configured in the form of tables, which will be described in more detail later below with reference to some example usage cases illustrated in FIGS. 6A-D.

Figure 3:
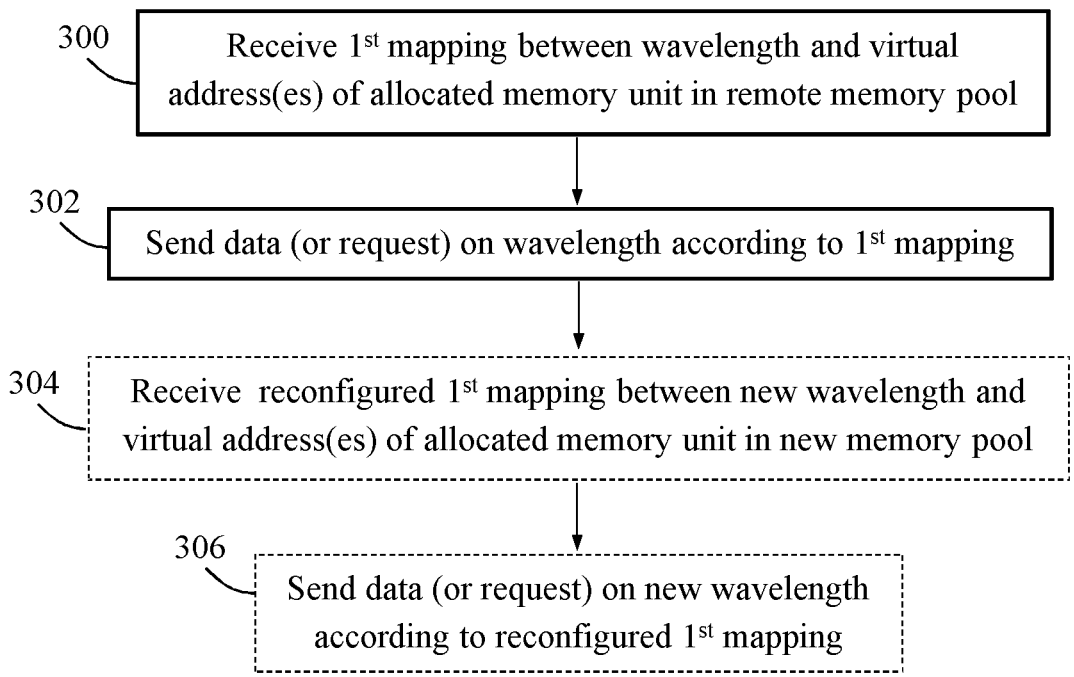
FIG. 3 is a flow chart illustrating a procedure in a computing unit, according to further example embodiments.

An example will now be described with reference to the flow chart in FIG. 3, of how the solution may be employed in terms of actions performed by a computing unit such as the above-described computing unit 202. FIG. 3 is described below with further reference to FIG. 2 although without limitation to such a communication scenario involving the computing unit 202. Some optional example embodiments that could be used in this procedure will also be described below.

The actions shown in FIG. 3 are thus performed by a computing unit 202 for using memory resources in a remote memory pool 204. It is assumed that the computing unit 202 is able to communicate with the remote memory pool 204 over an optical network comprising one or more optical switches using specific optical wavelengths, which is customary as such in optical networks. The following functionality may be realized by means of a controlling or managing entity in the computing unit 202 using suitable software and hardware components.

A first action 300 illustrates that the computing unit 202 receives a first mapping between an optical wavelength and at least one virtual address associated to a memory unit 204B in the memory pool allocated to the computing unit. This action corresponds to action 2:3A above. Some examples of how this first mapping may be configured in the computing unit 202 will be described later below with reference to FIGS. 6A-D. It is assumed that the computing unit 202 saves the received first mapping in a suitable manner.

In a next action 302, the computing unit 202 sends data or a storing request to the allocated memory unit on the optical wavelength over an optical network using said at least one virtual address as destination address, according to said first mapping. This action corresponds to action 2:5 above. Thereby, the optical network 206 is utilized efficiently to achieve rapid and reliable communication of messages (such as data or a storing request) from the computing unit 202 to the allocated memory unit 204B in the memory pool 204.

Some optional example embodiments that could be used in this procedure will now be described. In one example embodiment, the received first mapping may comprise a range of virtual addresses mapped to the assigned optical wavelength. In another example embodiment, the received first mapping may map the assigned optical wavelength to virtual addresses associated to at least two memory units in the memory pool allocated to the computing unit.

In another example embodiment, the computing unit 202 receives a reconfigured first mapping between a new optical wavelength and at least one virtual address associated to an added memory unit that has been allocated in a new memory pool to the computing unit, as illustrated by an optional action 304. In this case, the computing unit 202 may send data or a storing request to the new allocated memory unit on the new optical wavelength using the new memory unit's associated virtual address as destination address, according to the reconfigured first mapping, in another optional action 306. A more detailed example of how this reconfigured first mapping may be employed for communication will be described later below with reference to FIG. 6D.

In another example embodiment, the computing unit 202 may receive the first mapping from a resource scheduler 200, e.g. as shown in FIG. 2, which is basically responsible for assigning optical wavelengths for communication between computing units and memory units, and for configuring the computing unit and the memory pool at least with said first mapping.

In the above examples and procedures, it is further possible that a memory unit such as 204B can have more than one virtual address. It is also possible that a virtual address is mapped to more than one physical address, and the solution is not limited in this respect. Even though most examples herein refer to a one-to-one mapping between a virtual address and a memory unit, the embodiments herein also allow for other relationships including one virtual address can be mapped to different memory units on different wavelengths so that two or more computing units can use the same virtual address on different wavelengths to access different memory units in the memory pool.

Figure 4:
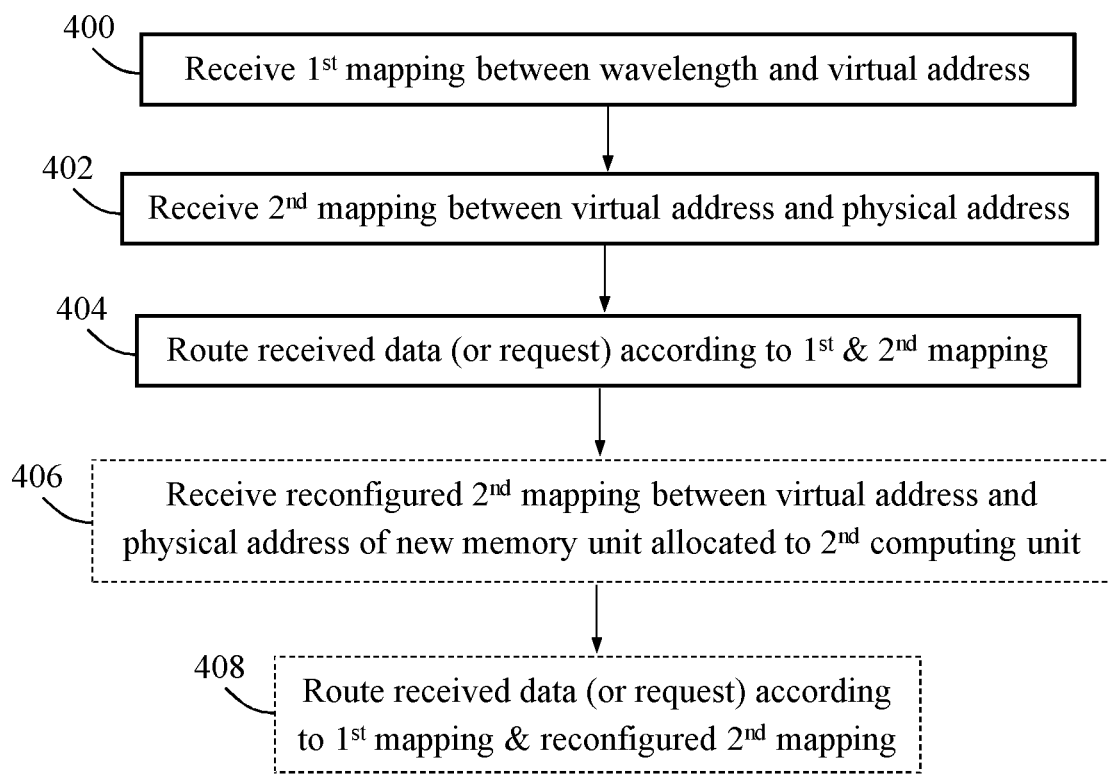
FIG. 4 is a flow chart illustrating a procedure in a memory pool, according to further example embodiments.

An example will now be described with reference to the flow chart in FIG. 4, of how the solution may be employed in terms of actions performed by a memory pool such as the above-described memory pool 204. FIG. 4 is described below likewise with further reference to FIG. 2 although without limitation to such a communication scenario involving the memory pool 204. Some optional example embodiments that could be used in this procedure will also be described below.

The actions shown in FIG. 4 are thus performed by a memory pool 204 for enabling one or more computing units 202 to use memory resources in the memory pool 204. It is assumed that the memory pool 204 is able to communicate with the computing unit 202 over an optical network comprising one or more optical switches using specific optical wavelengths, as also described above. The following functionality may be realized by means of a controlling or managing entity in the memory pool 204 using suitable software and hardware components.

A first action 400 illustrates that the memory pool 204 receives a first mapping between an optical wavelength and at least one virtual address associated to a memory unit 204B in the memory pool allocated to a first computing unit 202.

In a next action 402, the memory pool 204 further receives a second mapping between the at least one virtual address and a physical address of the allocated memory unit within the memory pool. Actions 400 and 402 correspond to action 2:3B above. Some examples of how these first and second mappings may be configured in the memory pool 204 will be described later below with reference to FIGS. 6A-D. It should be noted that actions 400 and 402 may be performed in any sequence order or even more or less simultaneously in a joint configuring operation. It is assumed that the memory pool 204 saves the received mappings in a suitable manner.

In a further action 404, the memory pool 204 routes incoming data or a storing request with the at least one virtual address as destination address, as received on the optical wavelength from the first computing unit, to said allocated memory unit according to the received first and second mappings. This action corresponds to action 2:6 above.

Some optional example embodiments that could be used in this procedure will now be described. In one example embodiment, the received first mapping may comprise a range of virtual addresses mapped to the assigned optical wavelength. In another example embodiment, the first mapping may map the assigned optical wavelength to at least two memory units in the remote memory pool allocated to the first computing unit. An example of how this embodiment may be employed in practice will be described later below with reference to FIG. 6A.

In another example embodiment, the first mapping may further map at least two different optical wavelengths to virtual addresses associated to memory units in the memory pool allocated to at least two computing units. An example of how this embodiment may be employed in practice will be described later below with reference to FIG. 6B.

In another example embodiment, the memory pool 204 may receive a reconfigured second mapping between one of said virtual addresses and a physical address of a new memory unit in the memory pool allocated to a second computing unit, which is also illustrated by an optional action 406. In this case, the memory pool 204 will route incoming data or a storing request with the latter virtual address as destination address, as received on the optical wavelength from the second computing unit, to said new memory unit according to the first mapping and the reconfigured second mapping, as shown in a further action 408. An example of how this embodiment may be employed in practice will be described later below with reference to FIG. 6C.

In another example embodiment, the memory pool 204 may receive the first and second mappings from a resource scheduler responsible for assigning optical wavelengths for communication between computing units and memory units, and for configuring the computing unit with said first mapping and the memory pool with said first and second mappings.

Figure 5:
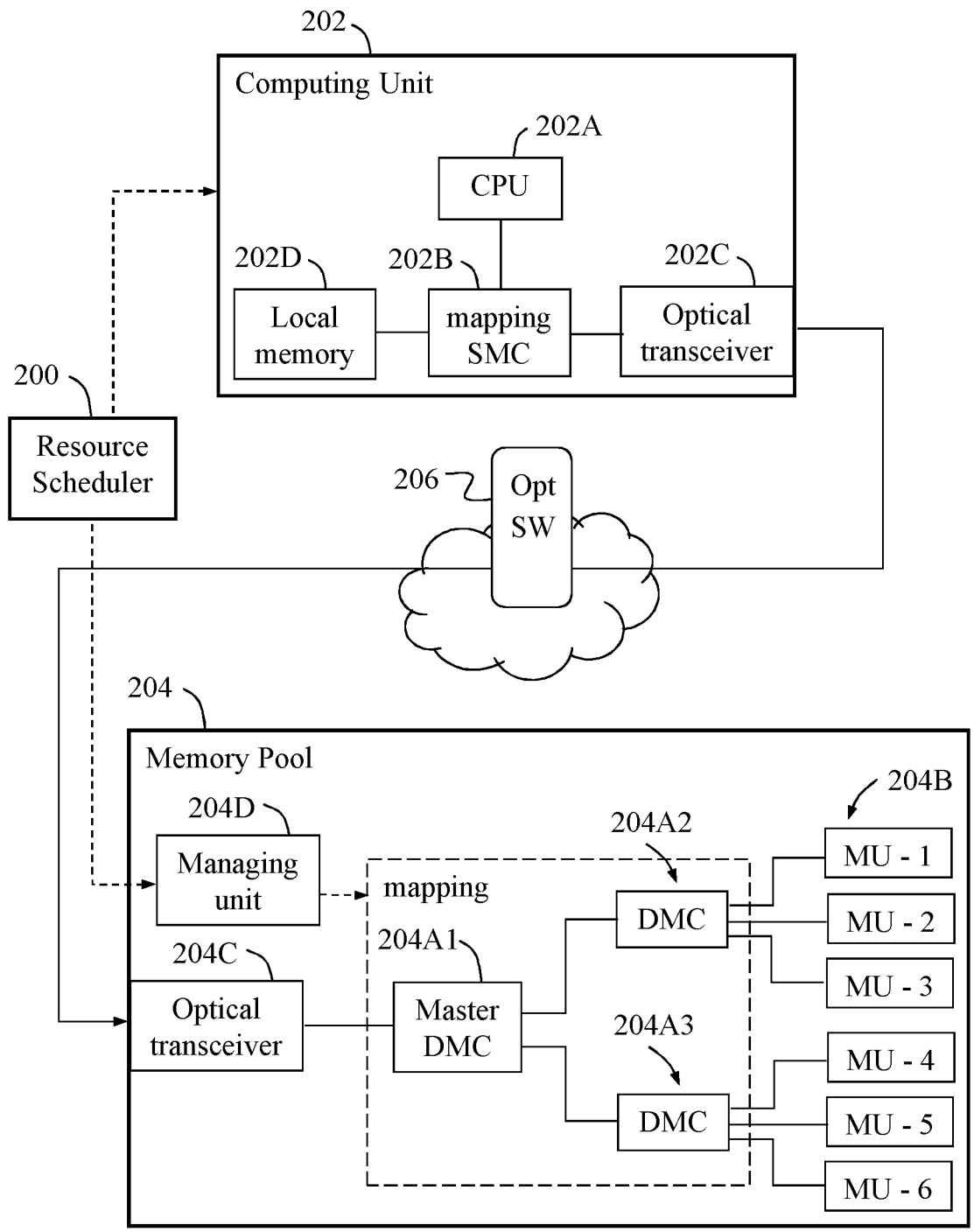
FIG. 5 is a block diagram illustrating a practical example of how a computing unit and a memory pool may be configured in more detail, according to further example embodiments.

Some examples of how the above-described computing unit 202 and memory pool 204 could be implemented in practice are illustrated in FIG. 5, which will now be described using the same numerals as of FIG. 2 where appropriate. Either of the computing unit 202 and the memory pool 204 may be configured with various mappings as described above, e.g. by the resource scheduler 200 as indicated by dashed arrows. The computing unit 202 and the memory pool 204 are also operable to communicate with each other over optical switches 206 of an optical network, in accordance with their configured mappings.

The computing unit 202 comprises a Central Processing Unit, CPU, 202A, which corresponds to the processor 202A shown in FIG. 2, for providing processing functionality of a server or the like. It is also possible that the computing unit 202 comprises multiple CPUs, e.g. when comprised in a "computing pool" with available processing resources as similar to the memory pool 204. It is furthermore possible that such a computing pool could be co-located with the memory pool at the same site or sled using internal optical links and switches for communication between the pools in the manner described herein. The computing unit 202 further comprises a mapping "Sled Memory Controller", SMC, 202B which corresponds to the mapping function 202B shown in FIG. 2, for mapping virtual addresses to optical wavelengths.

The computing unit 202 also comprises one or more optical transceivers 202C for sending and receiving optical signals communicated over the optical switches 206, and a local memory 202D for storing data locally. In this solution, it is assumed that the computing unit 202 needs storing resources which cannot be provided by the local memory 202D alone, although the latter may be useful for some storing tasks.

The memory pool 204 comprises a number of "Disaggregated Memory Controllers", DMCs, which correspond to the mapping function 204A shown in FIG. 2, for providing the above-described mapping functionality of the memory pool 204 including translation of virtual addresses to physical addresses. In this example, the mapping function is implemented as a master DMC 204A1 which directs incoming messages to either of two slave DMCs 204A2 and 204A3.

The memory pool 204 further comprises a number of memory units 204B which correspond to the memory unit(s) 204 shown in FIG. 2, for providing memory or storing resources. In this example, the slave DMC 204A2 is responsible for translating virtual addresses to a first set of physical addresses MU-1, MU-2 and MU-3, while the slave DMC 204A3 is responsible for translating virtual addresses to a second set of physical addresses MU-4, MU-5 and MU-6. Alternatively, only one DMC may be used which is responsible for translating virtual addresses to physical addresses of all memory units 204B.

The memory pool 204 also comprises one or more optical transceivers 204C for sending and receiving optical signals communicated over the optical switches 206, and a managing unit 204D for controlling operation of the memory pool 204, e.g. including communication with the resource scheduler 200 if used.

Some further examples of how the above-described embodiments could be implemented and used in different practical cases, will now be described with reference to usage cases illustrated in FIGS. 6A-D. In the following description, the term "message" is used for short to represent data or a request for storing resources, or a signal that can be used to read and retrieve some data from a memory, as sent by a computing unit towards a memory pool.

Figure 6A:
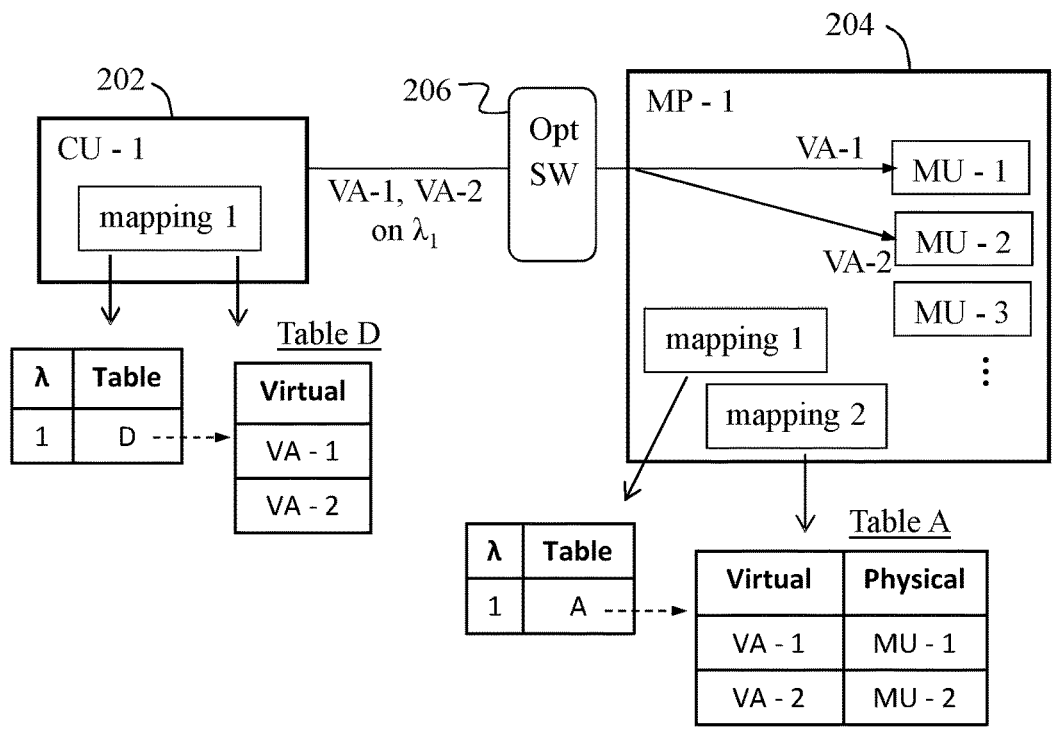
FIG. 6A is a diagram illustrating an example of how a computing unit CU-1 and a memory pool MP-1 may communicate according to received and configured mappings, according to further example embodiments.

As a first usage case, the above-mentioned embodiment where an optical wavelength $\lambda_1$ is assigned for communication between the computing unit 202 and two memory units in the remote memory pool 204, is illustrated in FIG. 6A, the computing unit 202 being denoted CU-1 and the memory pool 204 being denoted MP-1. The computing unit 202, the memory pool 204 and the optical switch(es) 206 are configured, e.g. by the resource scheduler 200, with different mappings as follows.

In more detail, the computing unit 202 and the memory pool 204 are configured with a first mapping, "mapping 1", which basically maps the wavelength $\lambda_1$ to virtual addresses denoted VA-1 and VA-2 associated to two memory units MU-1 and MU-2, respectively. This first mapping is implemented in the computing unit 202 as a mapping of wavelength $\lambda_1$ to a table D which in turn identifies the virtual addresses VA-1 and VA-2. The first mapping is implemented in the memory pool 204 as a mapping of wavelength $\lambda_1$ to a table A which likewise identifies the virtual addresses VA-1 and VA-2.

The memory pool 204 is further configured with a second mapping, "mapping 2", which basically comprises the table A which maps the virtual addresses VA-1 and VA-2 to corresponding physical addresses denoted MU-1 and MU-2. The resource scheduler 200 further configures the optical switch(es) 206 with a mapping of wavelength $\lambda_1$ to the memory pool 204 MP-1.

Thereby, when the computing unit 202 sends a message on the wavelength $\lambda_1$ with VA-1 as destination, the message will be routed to the memory pool 204 according to the wavelength $\lambda_1$. The memory pool 204 will then route this message to MU-1 based on the first and second mappings which indicate that VA-1 is associated with MU-1 for wavelength $\lambda_1$. Likewise, when the computing unit 202 sends a message on the wavelength $\lambda_1$ with VA-2 as destination, the memory pool 204 will route the latter message to MU-2 based on the first and second mappings which indicate that VA-2 is associated with MU-2 for wavelength $\lambda_1$.

Figure 6B:
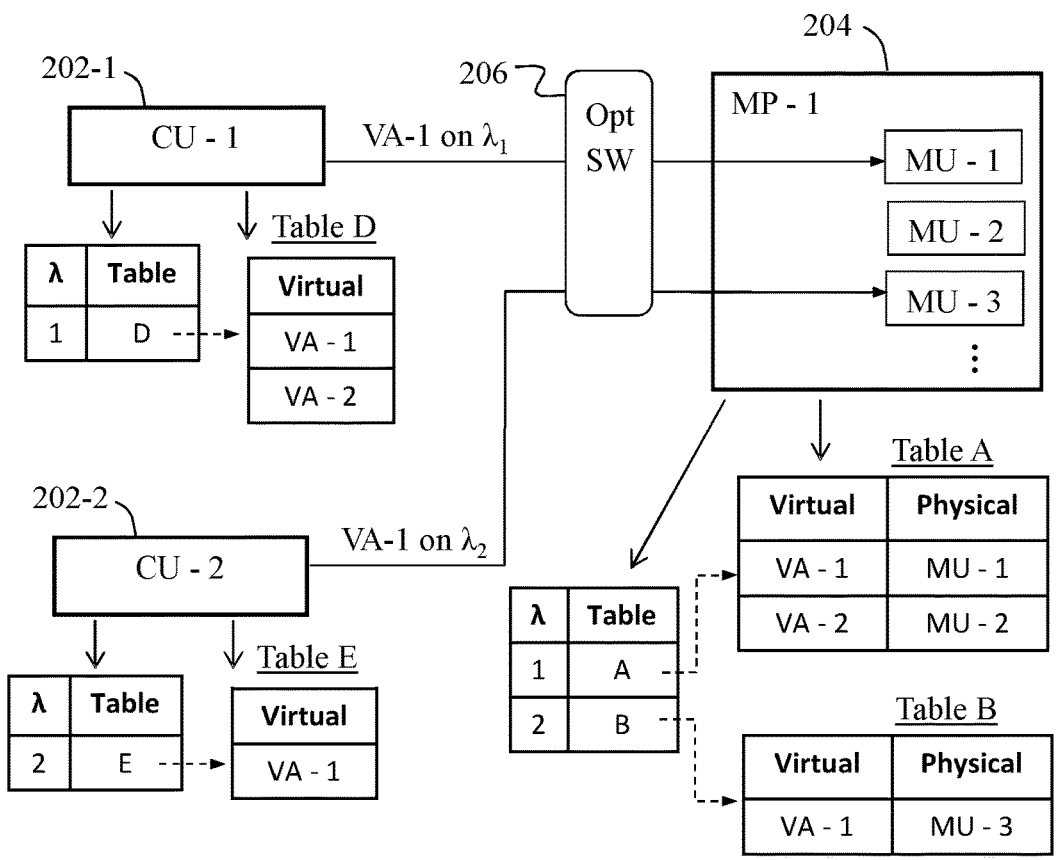
FIG. 6B is a diagram illustrating an example of how two computing units CU-1, CU-2 and a memory pool MP-1 may communicate according to received and configured mappings, according to further example embodiments.

As a second usage case, FIG. 6B illustrates the above-mentioned embodiment where two different optical wavelengths $\lambda_1$ and $\lambda_2$ are assigned for communication between two computing units 202-1 and 202-2 and two respective memory units MU-1 and MU-3 in the memory pool 204. The computing units 202-1 and 202-2, the memory pool 204 and the optical switch(es) 206 are configured, e.g. by the resource scheduler 200, with mappings as follows.

In this example, the computing unit 202-1 and the memory pool 204 are configured with a first mapping which maps the wavelength $\lambda_1$ to virtual addresses VA-1 and VA-2 associated to memory units MU-1 and MU-2, respectively. The first mapping is implemented in the computing unit 202-1 as a mapping of wavelength $\lambda_1$ to a table D which in turn identifies the virtual addresses VA-1 and VA-2. The first mapping is implemented in the other computing unit 202-2 as a mapping of wavelength $\lambda_2$ to a table E which in turn identifies the virtual address VA-1. The first mapping is implemented in the memory pool 204 as a mapping of wavelength $\lambda_1$ to a table A which identifies the virtual addresses VA-1 and VA-2, and a mapping of wavelength $\lambda_2$ to a table B which identifies the virtual addresses VA-1.

The memory pool 204 is further configured with a second mapping which basically comprises the table A which maps the virtual addresses VA-1 and VA-2 on wavelength $\lambda_1$ to corresponding physical addresses MU-1 and MU-2, and the table B which maps the virtual address VA-1 on wavelength $\lambda_2$ to a physical address MU-3. The resource scheduler 200 further configures the optical switch(es) 206 with a mapping of wavelengths $\lambda_1$ and $\lambda_2$ to the memory pool 204 MP-1.

Thereby, when the computing unit 202-1 sends a message on the wavelength $\lambda_1$ with VA-1 as destination, the message will be routed to the memory pool 204 according to the wavelength $\lambda_1$. The memory pool 204 will then route the message to MU-1 based on the first and second mappings which indicate that VA-1 is associated with MU-1 for wavelength $\lambda_1$. When the computing unit 202-2 sends a message on the wavelength $\lambda_2$ likewise with VA-1 as destination, the memory pool 204 will route the message to MU-3 based on the first and second mappings which indicate that VA-1 is associated with MU-3 for wavelength $\lambda_2$.

Figure 6C:
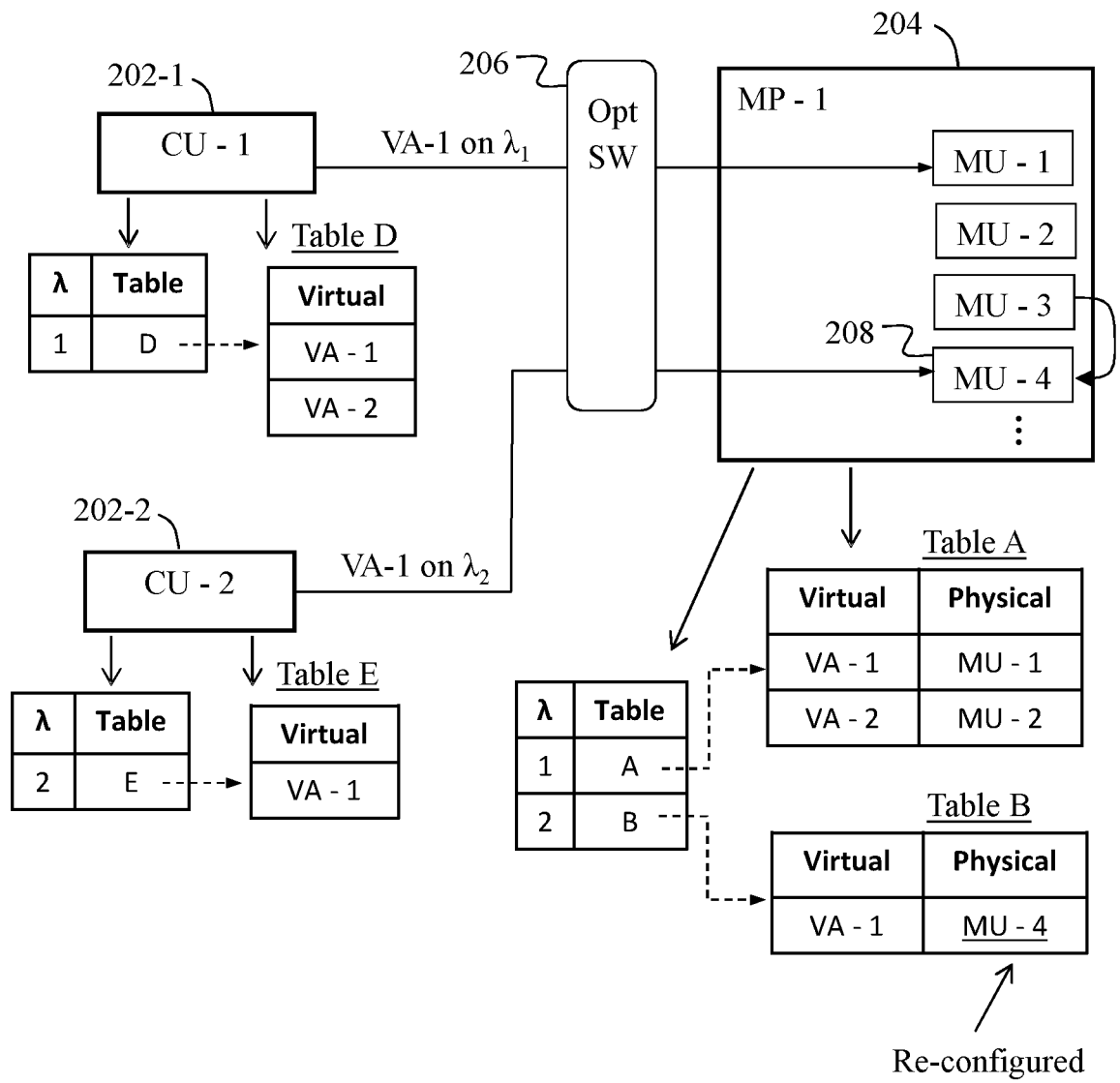
FIG. 6C is a diagram illustrating an example when one of the two computing units in FIG. 6B, CU-2, is allocated a new memory unit MU-4 in the same memory pool MP-1, and showing how they communicate according to received and configured mappings, according to further example embodiments.

As a third usage case, FIG. 6C illustrates the above-mentioned embodiment where a new memory unit 208 in the same memory pool 204 is allocated to a computing unit 202-2. As in FIG. 6B, two optical wavelengths $\lambda_1$ and $\lambda_2$ are assigned for communication between two computing units 202-1 and 202-2 and respective memory units MU-1-MU-3 in the memory pool 204. It is assumed in this example that the computing units 202-1 and 202-2, the memory pool 204 and the optical switch(es) 206 have already been configured with first and second mappings as described above for FIG. 6B.

In this example, the second mapping in the memory pool 204 is at some point reconfigured so that VA-1 is mapped to MU-4 instead of MU-3 for wavelength $\lambda_2$. For example, MU-3 may be corrupted, subjected to failure, or considered unsuitable for whatever reason and must be replaced. This reconfiguration is done basically by modifying the table B to map the virtual address VA-1 to a physical address MU-4 of the new memory unit 208. No further reconfiguration is needed and both the computing unit 202-2 and the optical switch(es) 206 are unaffected by this reconfiguration. Another advantage is that the computing unit 202-2 can continue to use storage resources in the memory pool 204 without being aware that a reconfiguration has taken place therein.

Thereby, when the computing unit 202-2 sends a message on the wavelength $\lambda_2$ likewise with VA-1 as destination, the memory pool 204 will route the message to MU-4 based on the first and second mappings which indicate that VA-1 is now associated with MU-4 for wavelength $\lambda_2$.

Figure 6D:
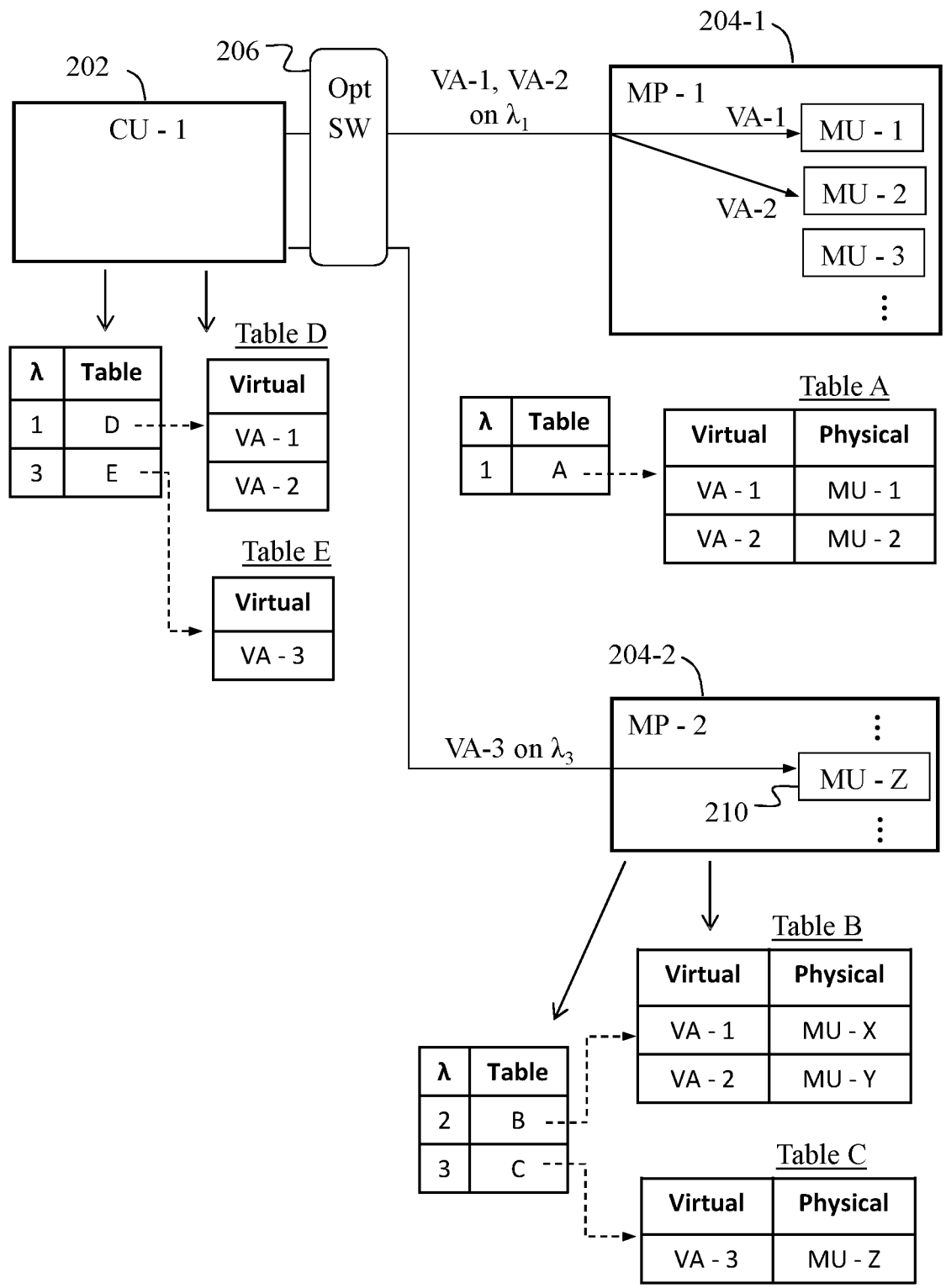
FIG. 6D is a diagram illustrating an example when a computing unit is allocated increased storing resources in two memory pools MP-1, MP-2, and showing how they communicate according to received and configured mappings, according to further example embodiments.

As a fourth usage case, FIG. 6D illustrates the above-mentioned embodiment where an added memory unit 210 in a new memory pool 204-2 denoted MP-2 is allocated to the computing unit 202, e.g. to increase the memory capacity for the computing unit 202. Thus, it is assumed that an optical wavelength $\lambda_1$ has already been assigned for communication between the computing unit 202 and two memory units in a first memory pool 204-1 denoted MP-1. In addition, another optical wavelength $\lambda_3$ is assigned for communication between the computing unit 202 and the added memory unit 210 in the new memory pool 204-2. In this case, the computing unit 202 and the optical switch(es) 206 are reconfigured, e.g. by the resource scheduler 200, with a new first mapping as follows.

It is further assumed that the computing unit 202 and the first memory pool 204-1 have already been configured with a first mapping which basically maps the wavelength $\lambda_1$ to virtual addresses VA-1 and VA-2 associated to two memory units MU-1 and MU-2, respectively, in the first memory pool 204-1. The first mapping is implemented in the computing unit 202 as a mapping of wavelength $\lambda_1$ to a table D which in turn identifies the virtual addresses VA-1 and VA-2. The first mapping is further implemented in the first memory pool 204-1 as a mapping of wavelength $\lambda_1$ to a table A which likewise identifies the virtual addresses VA-1 and VA-2.

The first memory pool 204-1 has also been configured with a second mapping implemented as a table A which maps the virtual addresses VA-1 and VA-2 to corresponding physical addresses MU-1 and MU-2. The optical switch(es) 206 has/have also been configured with a mapping of wavelength $\lambda_1$ to the memory pool 204-1, MP-1.

In this example, the new optical wavelength $\lambda_3$ is at some point assigned for communication between the computing unit 202 and the added memory unit 210 in the new memory pool 204-2. The first mapping is therefore reconfigured in the computing unit 202 and the optical switch(es) 206, to map the new optical wavelength $\lambda_3$ to a virtual address VA-3 of the added memory unit 210 denoted MU-Z in the memory pool 204-2.

The memory pool 204-2 is also configured with a first mapping which maps the wavelength $\lambda_3$ to the virtual address VA-3 by pointing to a table C, and with a second mapping which basically comprises the table C which maps the virtual address VA-3 to the physical address denoted MU-Z.

Thereby, when the computing unit 202 sends a message on the wavelength $\lambda_1$ with VA-1 as destination, the message will be routed to the first memory pool 204-1 according to the wavelength $\lambda_1$. The memory pool 204-1 will then route the message to MU-1 based on the first and second mappings in the memory pool 204-1 which indicate that VA-1 is associated with MU-1 for wavelength $\lambda_1$. Likewise, when the computing unit 202 sends a message on the wavelength $\lambda_1$ with VA-2 as destination, the memory pool 204 will route the message to MU-2 based on the first and second mappings which indicate that VA-2 is associated with MU-2 for wavelength $\lambda_1$.

When the computing unit 202 further sends a message on the wavelength $\lambda_3$ with VA-3 as destination, the message will be routed to memory pool 204-2 according to the wavelength $\lambda_3$, and the memory pool 204-2 will route the message to MU-Z of memory unit 210 based on the first and second mappings therein which indicate that VA-3 is associated with MU-Z for wavelength $\lambda_3$. This figure shows that the memory pool 204-2 has also been configured with another first mapping that maps wavelength $\lambda_2$ to virtual address VA-1 and VA-2 by pointing to a table B, and with a second mapping which basically comprises the table B which maps the virtual addresses VA-1 and VA-2 to physical address MU-X and MU-Y, respectively. However, the computing unit 202 of this example has not been configured to use wavelength $\lambda_2$ which may be used by some other computing unit(s), not shown.

Figure 7:
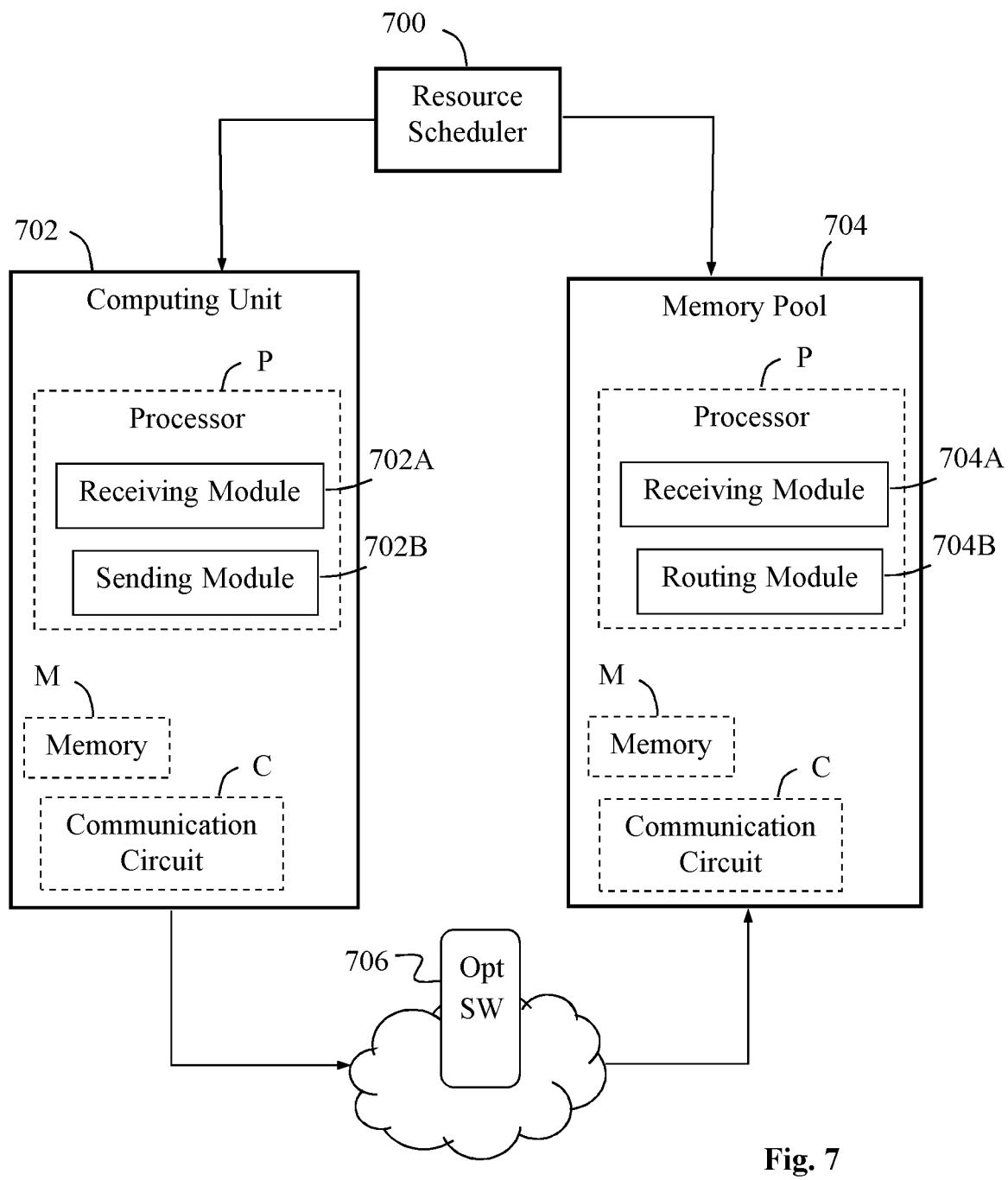
FIG. 7 is a block diagram illustrating how a computing unit, and a memory pool may be structured, according to further example embodiments.

The block diagram in FIG. 7 illustrates a detailed but non-limiting example of how a computing unit 702 and a memory pool 704, respectively, may be structured to bring about the above-described solution and embodiments thereof. In this figure, the computing unit 702 and the memory pool 704 may be configured to operate according to any of the examples and embodiments of employing the solution as described herein, where appropriate. Each of the computing unit 702 and the memory pool 704 is shown to comprise a processor "P", a memory "M" and a communication circuit "C" with suitable equipment for transmitting and receiving radio signals in the manner described herein.

The communication circuit C in each of the computing unit 702 and the memory pool 704 thus comprises equipment adapted for communication with each other using a suitable protocol for the communication depending on the implementation. The solution is however not limited to any specific types of messages or protocols.

The computing unit 702 is, e.g. by means of units, modules or the like, configured or arranged to perform at least some of the actions of the flow chart in FIG. 3 as follows. Further, the memory pool 704 is, e.g. by means of units, modules or the like, configured or arranged to perform at least some of the actions of the flow chart in FIG. 4 as follows.

The computing unit 702 is arranged to use remote memory resources in a memory pool 704. The computing unit 702 is configured to receive a first mapping between an optical wavelength and at least one virtual address associated to a memory unit in the memory pool allocated to the computing unit. This operation may be performed by a receiving module 702A in the computing unit 702, as illustrated in action 300. The receiving module 702A could alternatively be named a configuration module.

The computing unit 702 is further configured to send data or a storing request to the allocated memory unit on the optical wavelength over an optical network using said at least one virtual address as destination address, according to said first mapping. This operation may be performed by a sending module 702B in the computing unit 702, as illustrated in action 302. The sending module 702B could alternatively be named a requesting module.

The memory pool 704 is arranged to enable one or more computing units 702 to use remote memory resources in the memory pool. The memory pool 704 is configured to receive a first mapping between an optical wavelength and at least one virtual address associated to a memory unit in the memory pool allocated to a first computing unit. This operation may be performed by a receiving module 704A in the memory pool 704 as illustrated in action 400.

The memory pool 704 is also configured to receive a second mapping between the at least one virtual address and a physical address of the allocated memory unit within the memory pool. This operation may be performed by the receiving module 704A as illustrated in action 402.

The memory pool 704 is further configured to route data or a storing request with the at least one virtual address as destination address, as received on the optical wavelength from the first computing unit, to said allocated memory unit according to the received first and second mappings. This operation may be performed by a routing module 704B in the memory pool 704, as illustrated in action 404. The routing module 704B could alternatively be named a transferring module.

It should be noted that FIG. 7 illustrates various functional modules in the computing unit 702 and the memory pool 704, respectively, and the skilled person is able to implement these functional modules in practice using suitable software and hardware equipment. Thus, the solution is generally not limited to the shown structures of the computing unit 702 and the memory pool 704, and the functional modules therein may be configured to operate according to any of the features, examples and embodiments described in this disclosure, where appropriate.

The functional modules 702A-B and 704A-B described above may be implemented in the computing unit 702 and the memory pool 704, respectively, by means of program modules of a respective computer program comprising code means which, when run by the processor P causes the computing unit 702 and the memory pool 704 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the computing unit 702 and the memory pool 704 in the form of a memory having a computer readable medium and being connected to the processor P. The computer program product or memory M in each of the computing unit 702 and the memory pool 704 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective computing unit 702 and memory pool 704.

The solution described herein may be implemented in each of the computing unit 702 and the memory pool 704 by a computer program comprising instructions which, when executed on at least one processor, cause the at least one processor to carry out the actions according to any of the above embodiments and examples, where appropriate. The solution may also be implemented at each of the computing unit 702 and the memory pool 704 in a carrier containing the above computer program, wherein the carrier is one of an electronic signal, optical signal, radio signal, or computer readable storage medium.

While the solution has been described with reference to specific exemplifying embodiments, the description is generally only intended to illustrate the inventive concept and should not be taken as limiting the scope of the solution. For example, the terms "computing unit", "memory pool", "memory unit", "memory resources", "resource scheduler", "mapping table", "virtual address" and "physical address" have been used throughout this disclosure, although any other corresponding entities, functions, and/or parameters could also be used having the features and characteristics described here. The solution is defined by the appended claims.

The invention claimed is:

1. A method performed by a computing unit for using remote memory resources in a memory pool, wherein a server functionality is created by an allocation of a memory unit in the memory pool to the computing unit to store data for the computing unit, the method comprising:
   receiving a first mapping between an assigned optical wavelength and at least one virtual address associated with the memory pool; and
   sending data to the allocated memory unit on the optical wavelength over an optical network using said at least one virtual address as destination address, according to said first mapping, wherein the first mapping of the assigned optical wavelength and the at least one virtual address is also present in the memory pool and wherein the memory pool uses the first mapping to identify a second mapping containing virtual address to physical address translation to locate at least one physical address corresponding to the at least one virtual address to locate the memory unit allocated to the computing unit.

2. The method according to claim 1, wherein the received first mapping comprises a range of virtual addresses mapped to the assigned optical wavelength.

3. The method according to claim 1, wherein the received first mapping maps the assigned optical wavelength to virtual addresses associated to at least two memory units in the memory pool allocated to the computing unit.

4. The method according to claim 1, further comprising receiving a reconfigured first mapping between a new optical wavelength and at least one virtual address associated to an added memory unit in a new memory pool allocated to the computing unit.

5. The method according to claim 1, wherein the first mapping is received from a resource scheduler responsible for assigning optical wavelengths for communication between computing units and memory units, and for configuring the computing unit and the memory pool at least with said first mapping.

6. A computing unit to use remote memory resources in a memory pool, wherein a server functionality is created by an allocation of a memory unit in the memory pool to the computing unit to store data for the computing unit, the computing unit comprising:
   a processor; and
   a memory containing instructions which, when executed by the processor, cause the computing unit to:
      receive a first mapping between an assigned optical wavelength and at least one virtual address associated with the memory pool; and
      send data to the allocated memory unit on the optical wavelength over an optical network using said at least one virtual address as destination address, according to said first mapping, wherein the first mapping of the assigned optical wavelength and the at least one virtual address is also present in the memory pool and wherein the memory pool uses the first mapping to identify a second mapping containing virtual address to physical address translation to locate at least one physical address corresponding to the at least one virtual address to locate the memory unit allocated to the computing unit.

7. The computing unit according to claim 6, wherein the first mapping comprises a range of virtual addresses mapped to the assigned optical wavelength.

8. The computing unit according to claim 6, wherein the first mapping maps the assigned optical wavelength to virtual addresses associated to at least two memory units in the memory pool allocated to the computing unit.

9. The computing unit according to claim 6, wherein the computing unit is to receive a reconfigured first mapping between a new optical wavelength and at least one virtual address associated to an added memory unit in a new memory pool allocated to the computing unit.

10. The computing unit according to claim 6, wherein the computing unit is to receive the first mapping from a resource scheduler responsible for assigning optical wavelengths for communication between computing units and memory units, and for configuring the computing unit and the memory pool at least with said first mapping.

11. A method performed by a memory pool for enabling one or more computing units to use remote memory resources in the memory pool, wherein a server functionality is created by an allocation of a memory unit in the memory pool to the computing unit to store data for the computing unit, the method comprising:
   receiving a first mapping between an assigned optical wavelength and at least one virtual address associated with the memory pool;
   receiving a second mapping containing virtual address to physical address translation of the at least one virtual address to at least one physical address corresponding to the at least one virtual address to locate the memory unit allocated to the computing unit; and
   routing data with the at least one virtual address as destination address, as received on the assigned optical wavelength from the first computing unit, to said allocated memory unit according to the received first and second mappings.

12. The method according to claim 11, wherein the received first mapping comprises a range of virtual addresses mapped to the assigned optical wavelength.

13. The method according to claim 11, wherein the first mapping maps the assigned optical wavelength to at least two memory units in the memory pool allocated to the first computing unit.

14. The method according to claim 11, wherein the first mapping maps at least two different optical wavelengths to virtual addresses associated to memory units in the memory pool allocated to at least two computing units.

15. The method according to claim 14, further comprising receiving a reconfigured second mapping between one of said virtual addresses and a physical address of a new memory unit in the memory pool allocated to a second computing unit.

16. The method according to claim 11, wherein the first and second mappings are received from a resource scheduler responsible for assigning optical wavelengths for communication between computing units and memory units, and for configuring the computing unit with said first mapping and the memory pool with said first and second mappings.

17. A memory pool to enable one or more computing units to use remote memory resources in the memory pool, wherein a server functionality is created by an allocation of a memory unit in the memory pool to the computing unit to store data for the computing unit, the memory pool comprising:
 a processor; and
 a memory containing instructions which, when executed by the processor, cause the memory pool to:
  receive a first mapping between an assigned optical wavelength and at least one virtual address associated with the memory pool;
  receive a second mapping containing virtual address to physical address translation of the at least one virtual address to at least one physical address corresponding to the at least one virtual address to locate the memory unit allocated to the computing unit; and
  route data with the at least one virtual address as destination address, as received on the assigned optical wavelength from the first computing unit, to said allocated memory unit according to the received first and second mappings.

18. The memory pool according to claim 17, wherein the first mapping comprises a range of virtual addresses mapped to the assigned optical wavelength.

19. The memory pool according to claim 17, wherein the first mapping maps the assigned optical wavelength to at least two memory units in the memory pool allocated to the first computing unit.

20. The memory pool according to claim 17, wherein the first mapping maps at least two different optical wavelengths to virtual addresses associated to memory units in the memory pool allocated to at least two computing units.

21. The memory pool according to claim 20, wherein the memory pool is to receive a reconfigured second mapping between one of said virtual addresses and a physical address of a new memory unit in the memory pool allocated to a second computing unit.

22. The memory pool according to claim 17, wherein the memory pool is to receive the first and second mappings from a resource scheduler responsible for assigning optical wavelengths for communication between computing units and memory units, and for configuring the computing unit with said first mapping and the memory pool with said first and second mappings.

* * * * *